United States Patent [19]

Fraser et al.

[11] Patent Number: 4,607,658

[45] Date of Patent: Aug. 26, 1986

[54] WATER LEVEL CONTROL DEVICE

[76] Inventors: Gerald M. Fraser, 7460 Shaw Ave., Sardis, B.C., Canada, V2R 1A5; Marcel J. Champigny, No. 27 46689 1 Ave., Chilliwack, B.C., Canada, V2P 1XY

[21] Appl. No.: 793,903

[22] Filed: Nov. 1, 1985

[51] Int. Cl.[4] ............................................. F16R 21/18
[52] U.S. Cl. ........................................... 137/393; 4/191; 4/195; 4/205; 4/427; 4/508; 73/299; 137/390; 137/406; 137/426
[58] Field of Search ................. 73/299; 4/191, 195, 4/205, 427, 508; 137/390, 393, 403, 406, 426

[56] References Cited

U.S. PATENT DOCUMENTS

| Re. 26,631 | 7/1969 | Abbott | 137/393 |
| 1,537,915 | 5/1925 | Bell | 4/205 |
| 1,869,144 | 7/1932 | Green et al. | 137/393 |
| 3,344,804 | 10/1967 | Lyman | 137/406 |
| 3,545,481 | 12/1970 | Fratalia | 137/390 |
| 3,805,822 | 4/1974 | Joannon | 137/406 |
| 4,042,984 | 8/1977 | Butler | 4/538 |
| 4,161,188 | 7/1979 | Jorgensen | 137/393 |
| 4,292,996 | 10/1981 | Pataki et al. | 137/393 |
| 4,522,228 | 6/1985 | Campau | 137/393 |

Primary Examiner—G. L. Walton
Attorney, Agent, or Firm—Lee, Smith & Zickert

[57] ABSTRACT

A device for automatically controlling the water level in a basin, such as a bathtub. Air pressure in a tube is used to halt water flow into the basin when a desired water level is reached. Various water levels can be selected by opening pressure relief openings in the tube.

10 Claims, 2 Drawing Figures

WATER LEVEL CONTROL DEVICE

BACKGROUND OF THE INVENTION

This invention pertains to a devices for maintaining and controlling the water level in a basin, and in particular to a device for automatically controlling the flow of water into the basin dependent upon the water level in the basin.

When a basin, such as a bathtub, is being filled, ordinarily it is necessary for the bathtub to be attended during the filling procedure so that a desired water level is attained and there is no overflow. Should the person monitoring the filling of the bathtub be called away for any reason while water is running, the risk of overflow or over filling remains, wasting water and potentially causing water damage if an overflow occurs.

Water level control systems have been developed to automatically control the water level in a bathtub. For example, U.S. Pat. No. 4,042,984 discloses a complex electronic system for doing so. While the water level is monitored, the complexity of the control makes it prohibitively expensive. In addition, use of electricity near the bathtub creates a potential shock hazzard.

U.S. Pat. No. 1,744,073 discloses a device for automatically controlling the flow from a faucet which uses a float disposed in a separate housing attached to the bathtub. Because of the use of a float and the nature of the apparatus, it is difficult to vary the water level to any substantial degree. Also, over time, the float could lose it buoyancy, and because it is hidden behind the bathtub, a costly reconstruction effort might be necessary.

U.S. Pat. Nos. 2,687,740; 3,344,804 and 3,545,481 disclosed devices for controlling liquid level using air pressure. However, in each of the devices, air pressure is used to actuate a microswitch and other electronics are used to control the water flow. Such devices are quite costly to construct, and in the environment of a bathtub, having electronics near the tub creates the potential of dangerous shock.

A purely mechanical device for controlling the water level is disclosed in U.S. Pat. No. 3,805,822. However, the device is quite complex, using many parts, and is therefore commensurately expensive to construct. The many moving parts invite premature failure and costly repair.

U.S. Pat. No. 1,537,915 discloses a simple mechanical device for terminating the unattended water flow into a bathtub. However, the only time that the device is actuated is when water enters the bathtub overflow. There is no means of varying the ultimate water level if the device is used.

SUMMARY OF THE INVENTION

The invention pertains to a simple device which is dependent upon the water level in a basin for automatically controlling the flow of water into the basin. A valve is disposed in the water inlet into the basin and has two orientations, a first orientation which permits flow of water into the basin and a second orientation which halts the water flow. A valve operator is associated with the valve and includes a regulator having a flexible diaphragm. A linkage extends from the diaphragm to the valve for operating the valve. An air pressure tube is located in the basin in a vertical orientation, the tube having at least one stopable pressure relief opening along its length. Air pressure in the tube is communicated between the tube and the regulator for controlling the valve.

The valve may be a common stopper similar to that used to control the shower function of a bathtub, or it can be a rotatable type of valve which is disposed in the inlet into the basin. The regulator may be a common device having a hollow housing with the diaphragm being sealingly disposed therein.

Preferably, the tube includes a series of pressure relief openings spaced vertically from one another. A pressure plug is provided for each opening so that the water level in the basin can be controlled as desired by removal of one or more plugs.

When a rotatable valve is employed to control the water flow, the linkage between the diaphragm and the valve comprises an arm extending radially from the valve and a rod secured at one end to the diaphragm and at its other end to the arm such that translation of the arm causes rotation of the valve.

BRIEF DESCRIPTION OF THE DRAWINGS

The invention is described in greater detail in the following description of examples embodying the best mode of the invention, taken in conjunction with the drawing, in which.

DESCRIPTION OF EXAMPLES EMBODYING THE BEST MODE OF THE INVENTION

Figure 1:
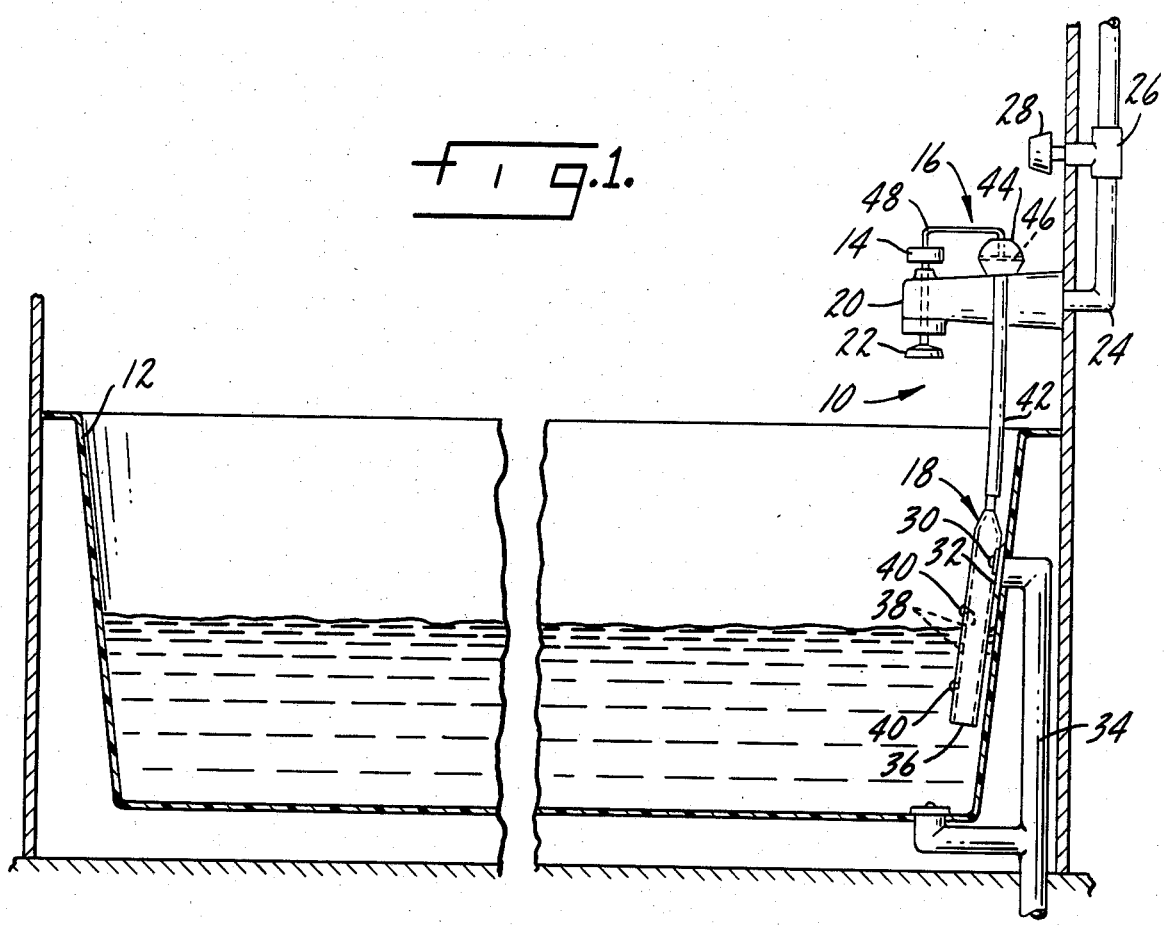
FIG. 1 is a cross-sectional view schematically showing a device according to the invention when installed in a bathtub.

A device according to the invention is shown generally at 10 in FIG. 1 when installed in conjunction with a bathtub 12. The device 10 is composed of three basic components, a valve 14, a valve operator 16, and a pressure tube 18.

The valve 14 is installed in a spout 20, and may, if desired, be identical to a stopper-type valve having a stopper 22 which, when the valve 14 is lifted, halts water flow from the spout 20. Such a valve is normally used in conjunction with a shower for a bathtub, but the shower would be eliminated in connection with the preferred embodiments of the present invention.

Water is supplied to the spout 20 through a line 24 leading from a mixer valve 26 which is provided hot and cold water from a suitable source (not illustrated). A control 28 conventionally regulates the flow of water through the mixer valve 26 to the spout 20 and into the bathtub 12.

The pressure tube 18 is located in the bathtub 12 where it will be at least partly immersed in any water contained therein. As shown in FIG. 1, the pressure tube 18 may be attached by a screw 30 to the standard cover 32 over the overflow 34 from the bathtub 12, thus maintaining the pressure tube 18 firmly in place.

The pressure tube 18 has an open bottom 36 and a hollow interior, and includes a series of pressure relief openings 38 along the length thereof. Plugs 40 are provided for the pressure relief openings 38 so that, as described in greater detail below, any number of the pressure relief openings 38 can be sealed to prevent escape of air from the interior of the pressure tube 18. The plugs 40 may be semi-rigid plastic inserts for the pressure relief openings 38, or the openings 38 can be threaded and the plugs 40 can comprise screws which are threaded into the openings 38.

A conduit 42 leads from the pressure tube 18 to the valve operator 16. The valve operator 16 includes a regulator 44 which may be a conventional diaphragm-type regulator having an internal diaphragm 46 sealingly disposed within the regulator 44. The valve operator 16 also includes a linkage 48 which extends from the diaphragm 46, through the regulator 44 and is attached to the valve 14. Upward movement of the diaphragm 46 creates upward movement of the linkage 48 and therefore upward movement of the valve 14. Sufficient upward movement of the diaphragm 46 will close the stopper 22 completely within the spout 20, thus preventing water flow from the spout 20.

Upward movement of the diaphragm 46 is controlled by air pressure within the combination of the regulator 44, conduit 42 and pressure tube 18. Pressure within that combination is, in turn, regulated by the water level within the tub 12. A particular given pressure will be adequate to close the valve 14, depending upon the water level within the bathtub 12.

The device 10 operates in conjunction with the water level within the tub 12 as follows. Depending on the desired final water level within the tub 12, one of the plugs 40 is removed from the pressure tube 18 or, if a minimum level is desired, none of the plugs 40 are removed and water is permitted to enter the open bottom 36, building air pressure within the entire length of the pressure tube 18. In the configuration shown in FIG. 1, one of the plugs 40 has been removed so that a medium water level in the bathtub 12 is obtained. Once the desired plug has been removed, the water into the bathtub 12 is turned on by means of the control 28. As the water level rises within the bathtub 12, and after the last open pressure relief opening is inundated by the water within the bathtub 12, air pressure begins to build within the tube 18, conduit 46 and regulator 44. As the air pressure increases, the diaphragm 46 is forced upwardly, raising the linkage 48 and concurrently raising the valve 14. When sufficient air pressure is experienced, the valve 14 is raised sufficiently so that the stopper 22 prevents any further water flow from the spout 20. For the sake of description, in the configuration shown in FIG. 1, if the control 28 were opened, water would be flowing from the spout 20, but for clarity, water flow has been omitted from the drawing.

Figure 2:
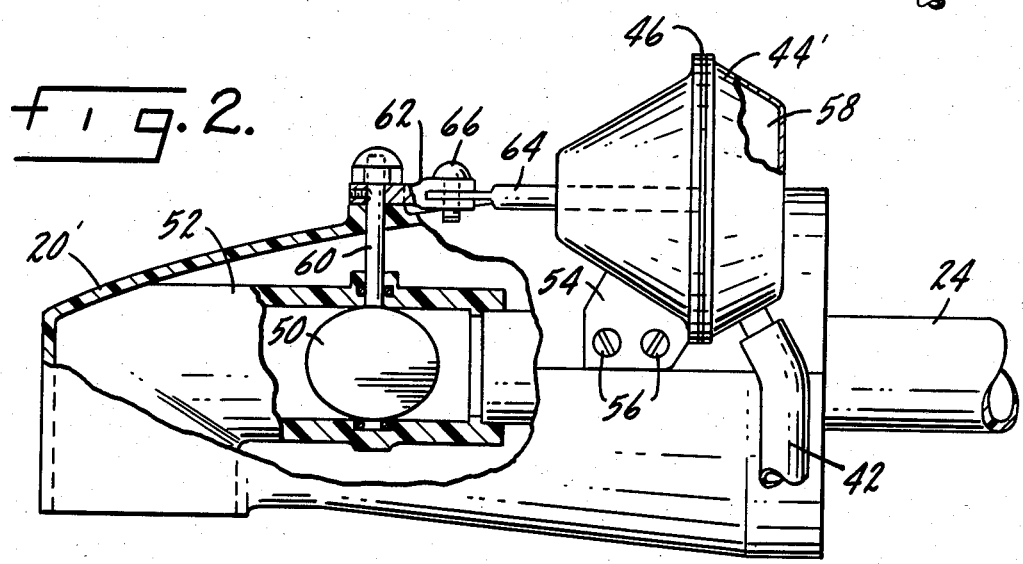
FIG. 2 is an enlarged elevational view, partially in cross section, showing a second embodiment of the invention.

FIG. 2 illustrates a second embodiment of the invention, similar to that of FIG. 1, and where identical elements are employed, the same reference numerals have been used. The pressure tube 18 which would be used in conjunction with the embodiment of FIG. 2 has been omitted since it is identical to that shown in FIG. 1.

In this embodiment of the invention, a butterfly valve 50 is used in place of the valve 14 and is installed in the internal water inlet 52 of the spout 20'. The valve 50 is rotatable between an open position (that illustrated) and a closed position 90° relative to that shown in FIG. 2 so that the water into the tub 12 may flow freely or be inhibited.

A regulator 44', identical in function to the regulator 44 of FIG. 1, is attached to the spout 20' by means of a bracket 54 and screws 56. The diaphragm 46 is sealingly disposed within the regulator 44', forming a pressure chamber 58 to the right of the diaphragm 46, which pressure chamber is connected to the conduit 42.

A stem 60 is attached to the valve 50 and extends upwardly through the wall of the spout 20'. A linkage, composed of an arm 62 and a rod 64, links the stem 60 to the diaphragm 46. The arm 62 extends radially outwardly from the stem 60 and is attached to the rod 64 by means of a threaded pin 66. The threaded pin 66 permits relative rotation between the arm 62 and the rod 64 so that when the rod 64 is extended from the regulator 44', the arm 62 is rotated, thus rotating the valve 50 via the stem 60.

The embodiment of the invention shown in FIG. 2 functions in a manner similar to that of FIG. 1. After a desired water level within the tub 12 has been determined and the water level rises within the tub 12, as soon as the last open pressure relief opening 38 has been surpassed by the water level, air pressure begins to build within the pressure chamber 58. The air pressure causes the flexible diaphragm 46 to move to the left in FIG. 2, extending the rod 64 and thus rotating the valve 50 through the combination of the stem 60 and arm 62. When sufficient air pressure is experienced within the pressure chamber 58, the rod 64 is extended sufficiently so that the valve 50 is rotated 90° from the orientation shown in FIG. 2 in order to prevent further water flow from the spout 20.

Various changes can be made to the invention, as would become evident to one skilled in the art. For example, although a butterfly-type valve 50 has been shown in the embodiment of FIG. 2, other types of rotatable valves can be employed to choke off the water flow from the spout 20. Other alterations can be made to the invention without departing from the spirit thereof or scope of the following claims.

What is claimed is:

1. A device dependent upon the water level in a basin for automatically controlling the flow of water into the basin, comprising
    (a) a water inlet into the basin,
    (b) a valve in said inlet having two orientations, a first orientation permitting flow of water from said inlet into said basin and a second orientation preventing flow of water from said inlet into said basin,
    (c) a valve operator associated with said valve, said valve operator including a regulator having a flexible diaphragm, and including a linkage extending from said diaphragm and connected to said valve for operating said valve,
    (e) an elongated air pressure tube located in the basin and disposed vertically, said tube having an open bottom and including at least one pressure relief opening in the length thereof for permitting selection of different water levels in the basin,
    (f) means extending between said tube and said regulator for communicating air pressure from said tube to said regulator.

2. A device according to claim 1 in which said valve comprises a stopper.

3. A device according to claim 1 in which said valve comprises a rotatable butterfly valve.

4. A device according to claim 1 in which said regulator includes a hollow housing with said diaphragm being sealingly disposed therein, said diaphragm together with said housing forming a pressure chamber, said pressure chamber being connected to said communicating means.

5. A device according to claim 1 in which said tube includes a series of said pressure relief openings spaced vertically from one another.

6. A device according to claim 5 in which said closing means comprises a removable plug for each said pressure relief opening.

7. A device according to claim 1 in which said closing means comprises a removable plug for said pressure relief opening.

8. A device according to claim 1 in which said communicating means comprises a hollow conduit.

9. A device according to claim 1 in which said valve is rotatable and includes a rotatable stem attached thereto, and in which said linkage comprises an arm extending radially from said stem and a rod secured at one end to said diaphragm and at the other end to said arm such that translation of said rod causes rotation of said valve by said arm.

10. A device dependent upon the water level in a basin for automatically controlling the flow of water from a faucet into the basin, comprising
   (a) a valve in the faucet having two orientations, a first orientation permitting flow of water from said faucet into said basin and a second orientation preventing flow of water from said faucet into said basin after a predetermined water level is attained in said basin,
   (b) a valve operator attached to said valve, said valve operator including a regulator having a flexible diaphragm disposed within a housing, and including a linkage secured to and extending from said diaphragm and connected to said valve for operating said valve,
   (c) an elongated air pressure tube located in the basin and disposed vertically, said tube having a plurality of pressure relief openings spaced vertically from one another for permitting selection of different water levels in the basin,
   (d) a removable plug for closing each pressure relief to prevent escape of air therefrom, and
   (e) a sealed conduit extending between said tube and said regulator for communicating air pressure from said tube to said regulator.

* * * * *